United States Patent
Kelly et al.

(10) Patent No.: US 8,705,524 B1
(45) Date of Patent: Apr. 22, 2014

(54) SYSTEMS AND METHODS FOR EMBEDDING METADATA IN DATA PACKETS

(75) Inventors: Jamie S. Kelly, Madison, AL (US); John Sudduth, Madison, AL (US); Darrin Gieger, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 211 days.

(21) Appl. No.: 12/817,899

(22) Filed: Jun. 17, 2010

(51) Int. Cl.
H04L 12/28 (2006.01)
H04L 29/06 (2006.01)
H04L 12/56 (2006.01)
H04L 29/08 (2006.01)

(52) U.S. Cl.
CPC ......... H04L 29/0653 (2013.01); *H04L 49/1515* (2013.01); *H04L 67/327* (2013.01)
USPC ............ 370/389; 370/387; 370/388; 370/392

(58) Field of Classification Search
CPC ...................... H04L 29/0653; H04L 29/06081; H04L 49/1515; H04L 12/5696; H04L 67/327; H04Q 3/68
USPC .............. 370/411, 230.1, 474, 387–389, 235, 370/392; 375/240.27; 713/160, 186
See application file for complete search history.

(56) References Cited

U.S. PATENT DOCUMENTS

| | | | | |
|---|---|---|---|---|
| 5,909,574 A | * | 6/1999 | Meyer | 712/244 |
| 6,668,022 B1 | * | 12/2003 | Kim | 375/240.27 |
| 7,263,609 B1 | * | 8/2007 | Wante et al. | 713/160 |
| 7,441,268 B2 | * | 10/2008 | Remedios | 726/13 |
| 8,107,370 B2 | * | 1/2012 | Chandika et al. | 370/230.1 |
| 2006/0075130 A1 | * | 4/2006 | Craft et al. | 709/230 |
| 2006/0088060 A1 | * | 4/2006 | Fujikami et al. | 370/474 |
| 2006/0215653 A1 | | 9/2006 | LaVigne et al. | |
| 2007/0091901 A1 | | 4/2007 | Grand et al. | |
| 2007/0106827 A1 | * | 5/2007 | Boatright et al. | 710/263 |
| 2008/0310352 A1 | | 12/2008 | McBeath et al. | |

* cited by examiner

*Primary Examiner* — Charles C Jiang
*Assistant Examiner* — Mohamed Kamara
(74) *Attorney, Agent, or Firm* — Maynard, Cooper & Gale, P.C.; Jon E. Holland

(57) ABSTRACT

A system for embedding metadata in data packets has logic that is configured to insert metadata into a data packet after the payload data and padding, if any. The logic further adjusts the packet's overhead, such as a frame check sequence, to account for the added length of the packet. The packet remains compliant with applicable protocols, such as Ethernet, and can be successfully communicated in accordance with such protocols while carrying the metadata. In this regard, the insertion of the metadata is transparent to protocol stacks such that the metadata data does not cause an error or the protocol stacks to render the packet invalid. In particular, the protocol stacks view the inserted metadata as part of the packet's pad field, and the inserted metadata should not cause any errors in the operation of the protocol stacks or prevent the protocol stacks from processing the packet.

32 Claims, 6 Drawing Sheets

SYSTEMS AND METHODS FOR EMBEDDING METADATA IN DATA PACKETS

RELATED ART

Telecommunication networks often employ Ethernet switching elements for controlling the paths of data packets propagating through the network. In general, a switching element has a plurality of ingress ports for receiving traffic, and a plurality of egress ports for transmitting the traffic to other nodes of the network. A packet received from an ingress port is forwarded to an appropriate egress port according to a forwarding table that is stored in the switching element.

In general, the flow of data packets from ingress ports to egress ports is controlled in hardware. However, it may be desirable to trap at least some data packets for software processing. An "exception" generally refers to a characteristic of a data packet that causes the packet to be trapped for specialized processing. Packets deemed to have an exception are directed from the normal packet flow to a microprocessor, and software within the microprocessor processes such packets in a desired manner depending on the reason for the exception. As an example, a protocol stack within the microprocessor might adjust the overhead of data packets from a certain packet flow (e.g., originating from a particular source or destined for a particular destination), thereby affecting how the packets are switched by the switching element or other devices of the network. There are various types of exceptions that can cause packets to be trapped within a network switching element, and there are many different operations that may be performed on a trapped packet.

Within an Ethernet switching element, the trapped packets are often communicated to and from the microprocessor via one or more Ethernet buses. Further, the protocol stack within the microprocessor may be configured to handle packets only in accordance with Ethernet protocol. In such cases, the trapped packets must be in conformance with Ethernet protocol to be successfully communicated over the Ethernet bus to the microprocessor. With respect to Ethernet data packets trapped within the switching element, such data packets can simply be forwarded to the microprocessor since the packets are already in conformance with Ethernet protocol.

However, it would be desirable to mark a trapped packet with various information, such as an indication as to the exception reason for trapping the packet, to facilitate processing of the packet by the protocol stack within the microprocessor. However, if such marking changes the data packet such that it is not in compliance with applicable Ethernet protocols, then it is unlikely that the data packet will be successfully received by the protocol stack. To avoid protocol incompatibility problems, a trapped data packet and metadata determined by the front-end circuitry are sometimes encapsulated together into a new Ethernet packet that is transmitted to the microprocessor. Examples of metadata fields, which is information not normally or possibly encoded in the packet header fields, include but are not limited to ingress port number, classified flow number, and exception identifier. Such new Ethernet packet carries the trapped packet and the metadata as payload data. However, the encapsulation may add complexity and increase processing time. In addition, the encapsulation increases the overall size of the packet that is transmitted to the microprocessor, thereby undesirably increasing latency.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for embedding metadata in data packets. In one exemplary embodiment, logic is configured to insert metadata into a data packet after the payload data and padding, if any. The logic further adjusts the packet's overhead, such as a frame check sequence, to account for the added length of the packet. The packet remains compliant with applicable protocols and can be successfully communicated in accordance with such protocols while carrying the metadata. In this regard, the insertion of the metadata is transparent to protocol stacks such that the metadata data does not cause an error or the protocol stacks to render the packet invalid. In particular, the protocol stacks view the inserted metadata as part of the packet's pad field, and the inserted metadata should not cause any errors in the operation of the protocol stacks or prevent the protocol stacks from processing the packet.

Figure 1:
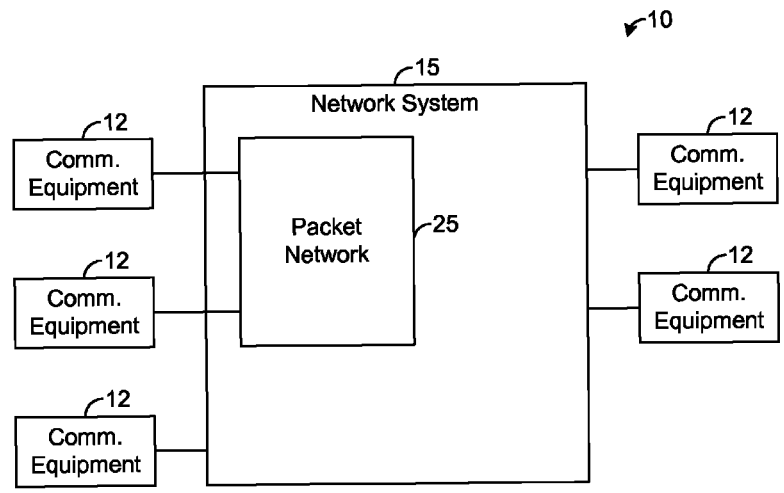
FIG. 1 is a block diagram illustrating an exemplary embodiment of a communication system.

FIG. 1 depicts a communication system 10 for enabling communication among a plurality of networked communication equipment 12, such as computers, servers, telephones, fax machines, gateways, etc. In this regard, each set of communication equipment 12 is coupled to a network system 15 and may communicate with another set of communication equipment 12 via the system 15. The system 15 comprises any number and types of networks, such as local area networks (LANs) and wide area networks (WANs). At least a portion of the network system 15 is implemented via a packet network 25 that is configured to route data packets. In one exemplary embodiment, the packet network 25 is an Ethernet network, but other types of protocols may be employed in other embodiments.

Figure 2:
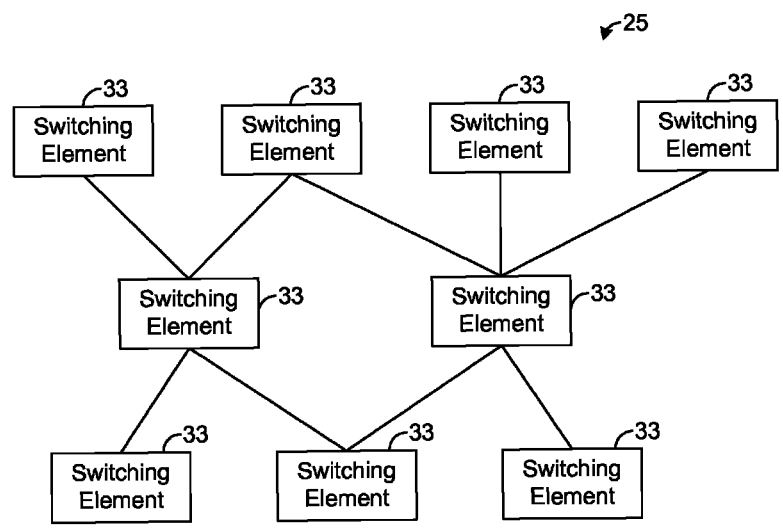
FIG. 2 is a block diagram illustrating an exemplary embodiment of a packet network, such as is depicted in FIG. 1.

As shown by FIG. 2, the packet network 25 comprises a plurality of interconnected switching elements 33. Each of the switching elements 33 is configured to receive data packets and to transmit the data packets to another switching element 33 or other device within the system 10.

Figure 3:
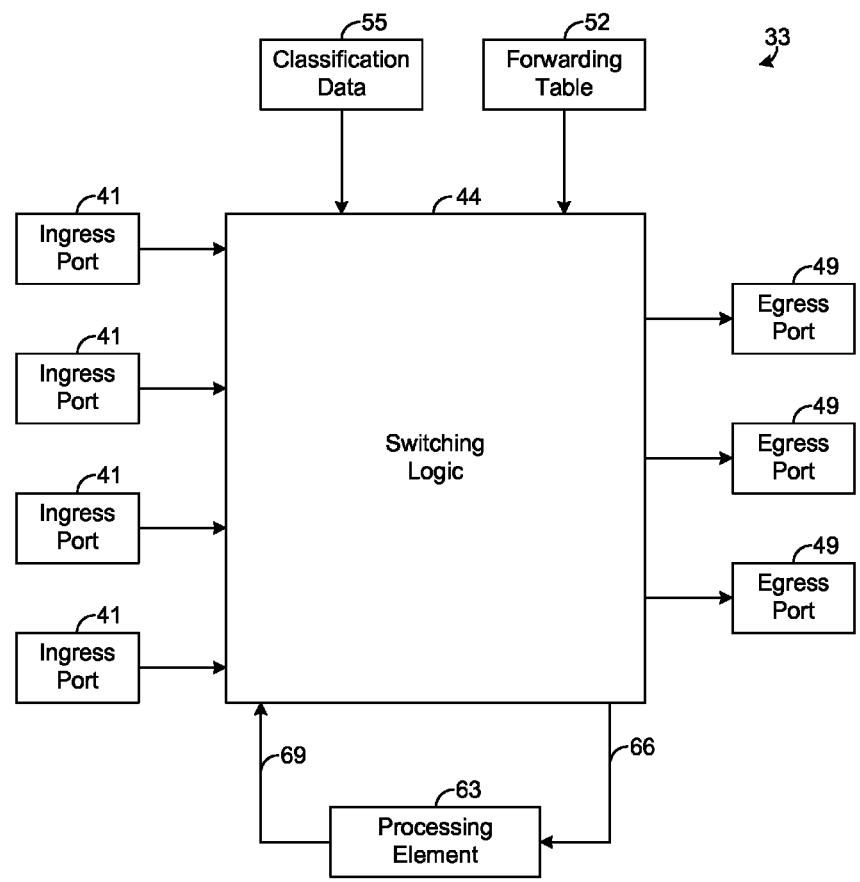
FIG. 3 is a block diagram illustrating an exemplary embodiment of a network switching element, such as is depicted in FIG. 2.

FIG. 3 depicts an exemplary embodiment of a switching element 33 of the packet network 25. For illustrative purposes, the switching element 33 will be described hereafter as an Ethernet switching element that is configured to receive and process Ethernet data packets. However, it should be emphasized that other protocols are possible in other embodiments, and it is unnecessary for the switching element 33 to be compatible the Ethernet data packets in other embodiments.

As shown by FIG. 3, the switching element 33 comprises a plurality of ingress ports 41 that are configured to receive data packets from other switching elements 33 or other devices of the system 10. It will be assumed hereafter that such data packets are in accordance with applicable Ethernet protocols, but the data packets may be in accordance with other protocols in other embodiments.

The ingress ports 41 are coupled to switching logic 44 that is configured to transmit the data packets to egress ports 49 for transmission from the switching element 33. In this regard, the switching logic 44 associates each data packet with a particular data flow and assigns the packet an identifier, referred to as a "flow identifier," of the associated data flow. A given data flow may correspond to a particular data service for a particular customer. For example, packets having a source address identifying a particular source or having a destination address identifying a particular destination may be assigned the same flow identifier such that all such packets egress from the same port 49.

As shown by FIG. 3, the switching logic 44 has access to a forwarding table 52 that is used to map flow identifiers to egress ports 49. In this regard, for each data packet, the switching logic 44 looks up the data packet's flow identifier in the forwarding table 52 to identify the egress port 49 that is mapped to such flow identifier. The switching logic 44 then forwards the packet to the identified egress port 49 for transmission.

In some cases, it may be desirable to trap a data packet such that it is directed out of the normal flow from the ingress ports 41 to the egress ports 49. In this regard, the switching logic 44 has access to classification data 55 and classifies each received packet based on such data 55. The classification data 55 indicates which packets have exceptions and, thus, should be trapped by the switching logic 44. As an example, the classification data 55 may indicate that packets having certain attributes, such as packets originating from a particular source or destined for a particular destination, should be trapped. To determine whether a packet has an exception and, thus, should be trapped, the switching logic 44 may compare metadata indicative of the packet's attributes to the classification data 55, as will be described in more detail hereafter.

When the switching logic 44 determines that a packet has an exception, the switching logic 44 traps the data packet by directing it to a processing element 63 that is configured to handle exceptions. In one exemplary embodiment, the processing element 63 comprises a microprocessor having protocol stacks for handling exceptions, but other types of processing elements 63 are possible in other embodiments.

As shown by FIG. 3, trapped packets are transmitted to the processing element 63 via a protocol-specific bus 66. In one exemplary embodiment, the bus 66 is an Ethernet bus such that only packets in accordance with applicable Ethernet protocols can be successfully transmitted over the bus 66. In other embodiments, other types of buses or connections may be used to transmit trapped packets to the processing element 63.

The processing element 63 is configured to process each trapped data packet depending on the exception reason for such packet. As an example, the processing element 63 may adjust the contents of a trapped data packet, such as the packet's overhead. In one exemplary embodiment, each packet received by the switching element 33 comprises a data packet of one protocol that is encapsulated in a data packet of another protocol. As an example, an Ethernet data packet received by the element 33 may comprise an Internet Protocol (IP) data packet that has been encapsulated according to Ethernet protocol, such as I.E.E.E. Standard 802.3. In such case the IP packet is the payload of the Ethernet packet. In handling an exception for such a packet, the processing element 63 may be configured to adjust the overhead of the encapsulated IP packet. As a mere example, the processing element 63 may change the destination address of the IP data packet or perform some other action depending on the type of exception detected for the trapped Ethernet packet.

Once the exception has been handled as may be desired, the processing element 63 transmits the trapped packet to the switching logic 44, which is configured to insert the packet back into the flow of packets from the ingress ports 41 to the egress ports 49. Thus, the packet is ultimately received by one of the egress ports 49 and egresses from the switching element 33.

In one exemplary embodiment, the packets handled by the processing element 63 are transmitted to the switching logic 44 via a protocol-specific bus 69, such as an Ethernet bus that allows only packets in accordance with applicable Ethernet protocols to be successfully transmitted. In other embodiments, other types of buses or connections may be used to transmit packets handled by the processing element 63.

Figure 4:
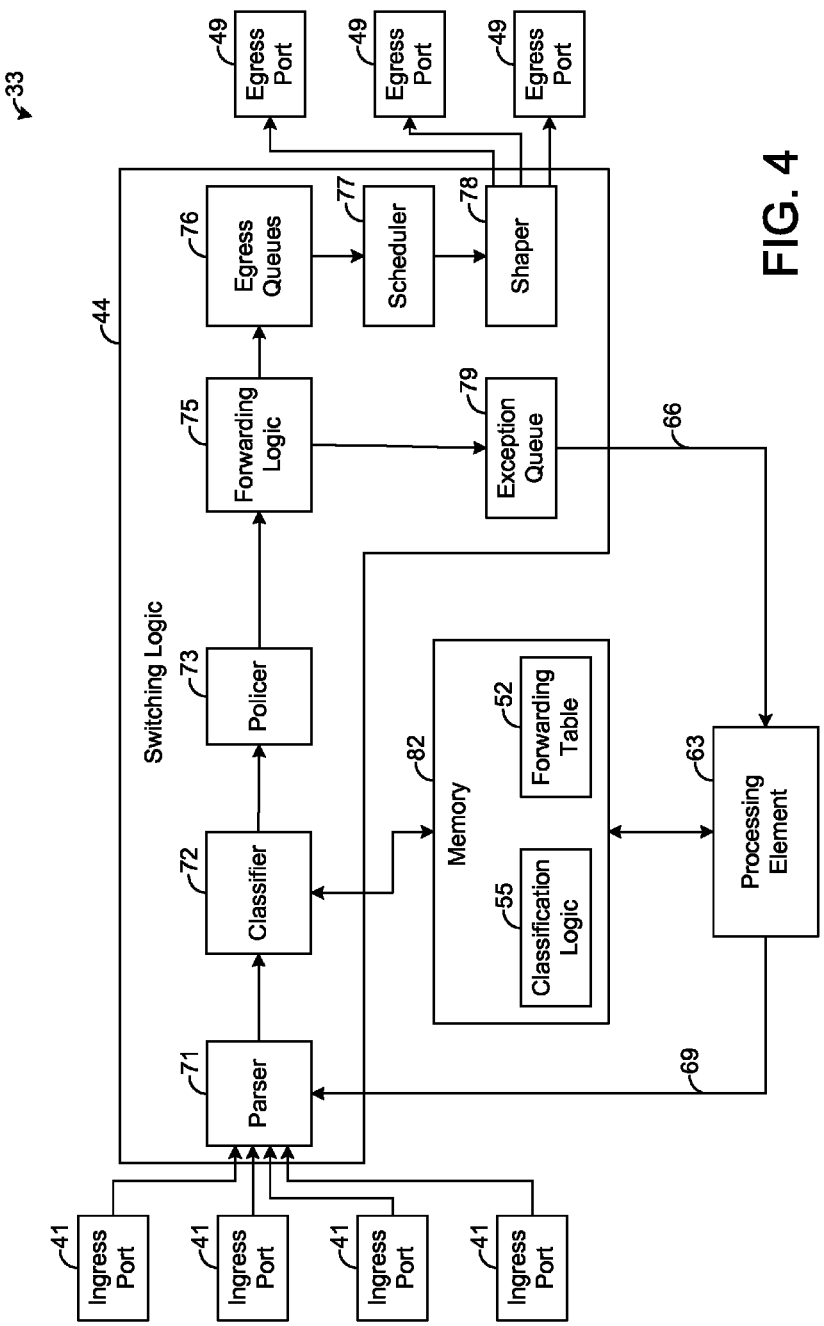
FIG. 4 is a block diagram illustrating an exemplary embodiment of a network switching element, such as is depicted in FIG. 3.

FIG. 4 depicts an exemplary embodiment of the switching logic 44. The exemplary logic 44 shown by FIG. 4 comprises a parser 71, a classifier 72, a policer 73, forwarding logic 75, egress queues 76, a scheduler 77, a shaper 78, and an exception queue 79. It should be noted that the configuration of the switching logic 44 shown by FIG. 4 is exemplary, and other configurations of the switching logic 44 are possible in other embodiments.

The ingress ports 41 are coupled to the parser 71, which is configured to receive data packets from the ingress ports 41. For each data packet, the parser 71 is configured to recover from the packet or otherwise determine metadata that is indicative of attributes of the packet. As an example, metadata may include a port identifier identifying the ingress port 41 from which the packet is received, a flow identifier identifying the packet flow associated with the packet, information from the packet's overhead, such as a source address or destination address, and/or other information indicative of packet attributes. The metadata may be used to process the packet within the switching element 33 such as to make forwarding decisions or to identify exceptions, as will be described in more detail hereafter. Various other operations based on the metadata are possible in other embodiments.

The classifier 72 is coupled to the parser 71 and receives the data packets from the parser 71. For each data packet, the classifier 72 is configured to classify the packet based on the metadata parsed by the parser 71. In this regard, the classifier 72 compares the metadata to classification data 55 stored in memory 82 and assigns the data packet a flow identifier based on such comparison. As an example, the classification data 55 may indicate that packets having a particular source or destination address are to be assigned a particular flow identifier. Based on such classification data 55 and the source or destination address of a received data packet, the classifier 72 may assign the foregoing flow identifier to the received data packet.

After assigning a flow identifier to a data packet, the classifier 72 looks up the flow identifier in the forwarding table 52 to determine a queue identifier identifying the egress queue 76 to which the data packet is to be forwarded. The classifier 72 adds the flow identifier and the queue identifier to the metadata and transmits the data packet, along with its metadata, to a policer 73. Note that the classifier 72 may add other types of data to the metadata. In one exemplary embodiment, each egress queue 76 feeds a single respective egress port 49, although multiple egress queues 76 may feed the same egress port 49. Thus, a queue identifier assigned to a data packet can be viewed as identifying both an egress queue 76 and the egress port 49 that is coupled the identified egress queue 76.

To prevent periods of congestion, the policer 73 is configured to selectively drop packets based on priority to prevent data overruns. The forwarding logic 75 is configured to switch the packets to the appropriate egress queues 76. In this regard, for each data packet, the forwarding logic 75 is configured to transmit the data packet to the queue (e.g., an egress queue 76) identified by the packet's metadata. In one exemplary embodiment, each egress queue 76 feeds a single egress port 49, although multiple egress queues 76 may feed the same egress port 49. Thus, each packet received by the same egress queue 76 is transmitted to and egresses from the same egress port 49. Accordingly, controlling which egress queue 76 receives a given data packet controls which egress port 49 transmits the packet and, hence, controls the packet's path from the switching element 33.

The scheduler 77 determines the order in which data packets are pulled from the egress queues 76, and the shaper 78 determines the timing of when data packets are pulled from the egress queues 76, as is known in the art.

In one exemplary embodiment, the switching logic 44, including each of the components 71-79 of the embodiment shown by FIG. 4, is implemented in hardware, such as a field programmable gate array (FPGA). In other embodiments, other configurations are possible. For example, it is possible for the parser 71, classifier 72, policer 73, forwarding logic 75, scheduler 77, and shaper 78 to be implemented in hardware, software, firmware, or any combination thereof.

When the classifier 72 compares the metadata of a data packet to the classification data 55, the classifier 72 may determine that the data packet has an exception based on such comparison. In such case, the classifier 72 traps the data packet such that it is directed to the processing element 63. In this regard, rather than associating the data packet with a queue identifier identifying one of the egress queues 76, the classifier 72 associates the packet with a queue identifier identifying the exception queue 79. Based on such queue identifier, the forwarding logic 75 forwards the packet to the exception queue 79 rather than one of the egress queues 76 thereby separating the data packet from the normal flow of packets from the ingress ports 41 to the egress ports 49.

Figure 5:
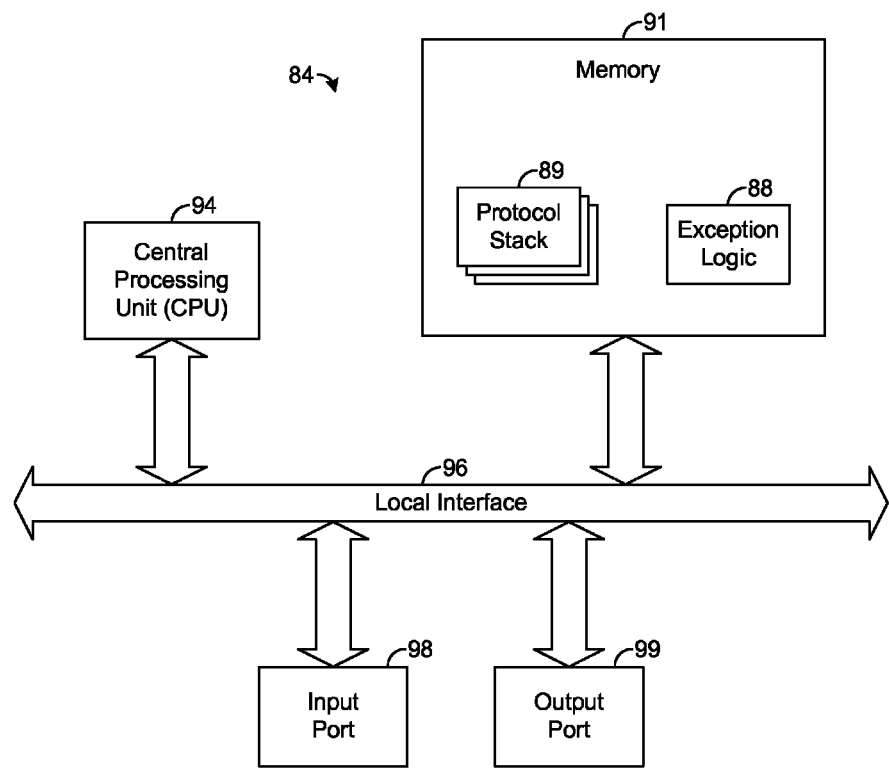
FIG. 5 is a block diagram illustrating an exemplary embodiment of a microprocessor used to handle exceptions within a network switching element, such as is depicted by FIG. 4.

Trapped data packets are transmitted from the exception queue 79 to the processing element 63 via the protocol-specific bus 66, although other types of buses or connections may be used in other embodiments. In one exemplary embodiment, the processing element 63 comprises a microprocessor, although other types of processing elements may be employed in other embodiments. FIG. 5 depicts an exemplary embodiment of a microprocessor 84 that may be used to implement the processing element 63. In other embodiments, other types of processing elements 63 may be employed.

As shown by FIG. 5, the microprocessor 84 has exception logic 88 and a plurality of protocol stacks 89. In the embodiment shown by FIG. 5, the exception logic 88 and protocol stacks 89 are implemented in software and stored in memory 91. The microprocessor 84 has a central processing unit (CPU) 94 for executing instructions of software, such as the protocol stacks 89 and exception logic 88, stored in the microprocessor 84. The CPU 94 communicates to and drives the other elements within the microprocessor 84 via a local interface 96, which can include at least one bus. Furthermore, the microprocessor 84 has an input port 98 that is coupled to the bus 66 (FIG. 4) and receives trapped data packets from the exception queue 79 (FIG. 4). The microprocessor 84 also has an output port 99 that is coupled to the bus 69 (FIG. 4) and transmits handled data packets to the parser 71 (FIG. 4).

The exception logic 88 is configured to analyze a trapped data packet and to select one the protocol stacks 89 for handling such data packet based on the type of exception detected for the data packet. In this regard, the exception logic 88 analyzes the metadata associated with the data packet by the classifier 72 or otherwise to determine the reason for the exception. Based on the exception type, the exception logic 88 then selects and invokes at least one of the protocol stacks 89 to handle the exception. In one exemplary embodiment, each protocol stack 89 is configured to handle Ethernet packets, but any of the protocol stacks 89 may be configured to handle packets in accordance with other protocols in other embodiments.

In handling a data packet, a protocol stack 89 may adjust the packet, such as adjust overhead information within the packet. Alternatively, a protocol stack 89 may encapsulate the packet with new overhead information (e.g., add a layer of overhead). Various other operations may be performed on the packet depending on the type of exception detected for the packet.

After processing of a data packet, the protocol stack 89 is configured to transmit the data packet via the output port 99 to the parser 71 (FIG. 4). The packet is then processed as described above for the packets received from the ingress ports 41. Thus, the classifier 72 associates the packet with a queue identifier identifying an egress queue 76, and the packet is eventually forwarded to this egress queue 76. The packet ultimately egresses from the switching element 33 via the egress port 49 that is coupled to such queue 76.

As described above, when the classifier 72 detects an exception for a data packet, the classifier 72 traps the packet by associating it with a queue identifier identifying the exception queue 79. Before transmitting a trapped data packet to the policer 73, the classifier 72 is configured to embed the packet's metadata into the packet in a manner that keeps the packet in conformance with Ethernet protocol (or other protocol in embodiments in which other protocols are employed). Exemplary techniques for so embedding metadata will now be described in detail below.

Figure 6:
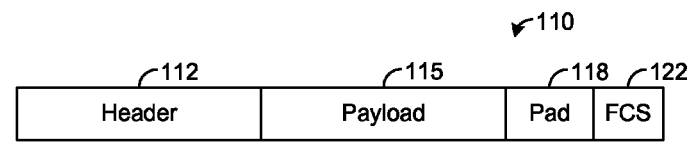
FIG. 6 is a block diagram illustrating an exemplary embodiment of data packet.

In this regard, FIG. 6 depicts an exemplary data packet 110 received by an ingress port 41. The packet 110 has a header 112 comprising various Ethernet header fields. Following the header 112 is a payload field 115 that has payload data. In one exemplary embodiment, the payload field 115 comprises a data packet in accordance with another protocol, such as IP or transmission control protocol (TCP), that has been encapsulated with Ethernet header information to form the Ethernet packet 110.

Following the payload field 115 is an optional pad field 118 that can be used to control the overall length of the packet 110. For example, in one exemplary embodiment, the packet 110 is in accordance with I.E.E.E. Standard 802.3, which places certain size constraints on packets in conformance with the standard, although other protocols may be employed in other embodiments. It is well-known to add pad bytes to the pad field 118 when the size of the packet 110 is not in conformance with applicable Ethernet protocol. As an example, assume that the applicable Ethernet protocol requires a minimum length of 64 bytes, yet the length of the packet 110 before adding a pad field 118 is less than 64 bytes. In such example, pad bytes may be added to the pad field 118 until the overall length of the packet 110 is at least 64 bytes such that the packet 110 is now compliant with the applicable Ethernet protocol. The pad field 118 contains no useful information and can be ignored or discarded when the packet 110 is de-encapsulated.

Following the pad field 118 is a frame check sequence (FCS) 122. The FCS 122 is a sequence of bits that enables verification of the packet 110. For example, in one exemplary embodiment, the FCS 122 is a checksum of the bits in the header 112, the payload field 115, and the pad field 118 prior to transmission of the packet 110 to the switching element 33. Such a checksum may be calculated by exclusively-ORing the bits in the header 112, the payload field 115, and the pad field 118. Thus, according to known techniques, the FCS 122 can be compared to the remainder of the packet 110 by the classifier 72 or other component of the switching element 33 to determine whether the packet 110 contains errors. In other embodiments, other types of frame checking data may be used to implement the FCS 122. Note that, when the packet 110 is transmitted, the header 112 precedes the payload field 115, the payload field 115 precedes the pad field 118, and the pad field precedes the FCS 122, per Ethernet protocol.

Figure 7:
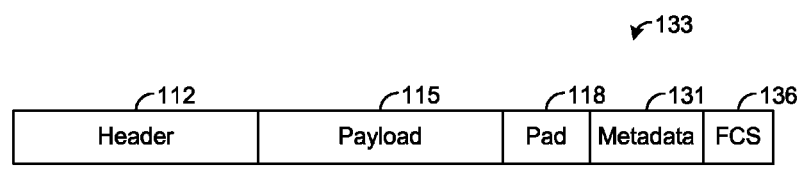
FIG. 7 is a block diagram illustrating the exemplary data packet of FIG. 6 after a frame check sequence has been changed and after metadata has been inserted into the data packet.

When the classifier 72 detects an exception for the data packet 110, the classifier 72 embeds metadata indicative of the exception or otherwise in the packet 110 such that the packet 110 remains compatible with Ethernet protocol. In this regard, the classifier 72 appends metadata 131 to the pad field 118 in order to provide a modified data packet 133, as shown by FIG. 7. If there is no pad field 118, the classifier 72 appends the metadata 131 to the payload field 115. In addition, the classifier 72 calculates a new FCS 136 that takes into account the inserted metadata 131, and the classifier 72 replaces the FCS 122 of the packet 110 with the newly calculated FCS 136.

Note that there are various techniques that can be used to calculate the FCS 136. For example, the classifier 72 may calculate the FCS 136 based on the replaced FCS 122. In this regard, if the FCS 122 represents a checksum of the remainder of the data packet 110, then the classifier 72 may be configured to combine (e.g., exclusively-OR) the FCS 122 with the metadata 131. Alternatively, the classifier 72 may calculate the FCS 136 anew by combining (e.g., exclusively-ORing) the header 112, the payload field 115, the pad field 118, and the metadata 131. Various other techniques for calculating the FCS 136 are possible in other embodiments.

Except for the addition of the metadata 131 and the replacement of the FCS 122 with the FCS 136, the modified packet 133 is the same as the packet 110. Thus, the header 112, the payload field 115, and the pad field 118 remain unchanged by the insertion of the metadata 131. Further, as indicated above, the modified packet 133 is compliant with Ethernet protocol and can, thus, be successfully transmitted over the protocol-specific bus 66 to the processing element 63.

The exception logic 88 (FIG. 5) is configured to read the metadata 131 and use the metadata 131 to determine the reason that an exception was detected for the modified packet 133. Note that there are a variety of ways that the exception logic 88 may be configured to find the metadata 131 within the modified packet 133. In one exemplary embodiment, the type of metadata 131 that is inserted into each trapped packet is the same from packet-to-packet, and the byte length of this metadata 131 is also the same from packet-to-packet. Thus, the metadata 131 occupies the same byte positions relative to the FCS 136 for each packet received by the processing element 63. As an example, if the bit length of the metadata 131 is x (where x is any positive integer), then the metadata 131 occupies the x successive bytes that precede the FCS 136.

Based on the metadata 131, the exception logic 88 determines the reason for the exception that resulted in the packet 133 being directed to the processing element 63. As one example, the metadata 131 may include the same packet attributes, such as destination address, source address, or ingress port identifier, used by the classifier 72 to detect the exception. In another exemplary embodiment, the metadata 131 has an exception identifier that identifies the exception by the classifier 72. Various other types of attributes may be indicated by the metadata 131 in other embodiments. Based on the exception reason, the exception logic 88 selects one of the protocol stacks 89 to handle the exception. The selected protocol stack 89 then processes the packet 133 (e.g., changes the header field 112 or the overhead of the encapsulated packet in the payload field 115) such that the exception is appropriately handled.

In one exemplary embodiment, the protocol stacks 89 are protocol-specific in that they handle packets according to certain protocol or protocols, such as Ethernet protocols. If a given protocol stack 89 receives a packet that is not in conformance with the specific protocol or protocols, then the stack 89 determines that the packet is invalid and refrains from processing the packet as it otherwise would if the packet was in conformance with the specific protocol or protocols. As an example, if a packet is deemed invalid, the protocol stack 89 might discard the packet.

In the instant example, the modified packet 133, is in conformance with Ethernet protocol, and the protocol stack 89 selected to handle the packet 133 does not deem the packet 133 to be invalid. Further, in one exemplary embodiment, the protocol stacks 89 are not aware that the metadata 131 has been inserted into the packet 133. In this regard, the protocol stack 89 selected to handle the packet 133 is configured to find the payload field 115 based on information in the header 112 and view all information between the payload field 115 and the FCS 136 as padding. Thus, the insertion of the metadata 131 between the payload field 115 and the FCS 136 does not cause any errors in operation of the protocol stack 89 even if the protocol stack 89 is unaware of insertion of the metadata 131. Thus, conventional protocol stacks that have not been specifically configured to recognize the metadata 131 may be used to implement any of the protocol stacks 89 depicted by FIG. 5. The insertion of the metadata 131 is transparent to such conventional protocol stacks. However, if desired, the protocol stack 89 selected for handling the packet 133 may be configured to find and/or utilize the metadata 131 in other embodiments.

Once the modified packet 133 is processed by the processing element 63, the packet 133 is transmitted to the parser 71 (FIG. 4), which indicates to the classifier 72 that the packet 133 was received from the processing element 63. As an example, the parser 71 may set the ingress identifier associated with the packet 133 to identify the processing element 63 rather than an ingress port 41. When the classifier 72 receives a packet that has been processed by the processing element 63, the classifier 72 assumes that any exception for the packet has been handled and, thus, refrains from detecting an exception. Such packet is forwarded to one of the egress queues 76 and eventually egresses the switching element 33.

Figure 8:
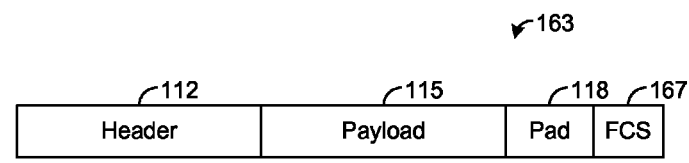
FIG. 8 is a block diagram illustrating the exemplary data packet of FIG. 7 after a frame check sequence has been changed and after metadata has been stripped from the data packet.

However, before transmitting the packet 133 to the policer 73, the classifier 72 is configured to strip the metadata 131 from the packet 133, thereby providing a modified packet 163 that is missing the metadata 131, as shown by FIG. 8. In this regard, for each packet 133 received from the processing element 63, the classifier 72 may be configured to find metadata 131 for stripping via the same or similar techniques used by the exception logic 88 to find the metadata 131, as described above. In addition, the classifier 72 calculates a new FCS 167 that takes into account the stripping of the metadata 131, and the classifier 72 replaces the FCS 136 of the packet 133 with the newly calculated FCS 167.

Note that there are various techniques that can be used to calculate the FCS 167. For example, the classifier 72 may calculate the FCS 167 based on the replaced FCS 136. In this regard, if the FCS 136 represents a checksum of the remainder of the data packet 133, then the classifier 72 may be configured to combine (e.g., exclusively-OR) the FCS 136 with the metadata 131. Alternatively, the classifier 72 may calculate the FCS 167 anew by combining (e.g., exclusively-ORing) the header 112, the payload field 115, and the pad field 118. Various other techniques for calculating the FCS 167 are possible in other embodiments.

Except for the stripping of the metadata 131 and the replacement of the FCS 136 with the FCS 167, the modified packet 163 is the same as the packet 133. Thus, the header 112, the payload field 115, and the pad field 118 remain unchanged by the stripping of the metadata 131. Further, the modified packet 163 is compliant with Ethernet protocols. In this regard, the stripping of the metadata 131 reduces overall packet length relative to the packet 133 but does not cause the packet 163 to violate Ethernet protocols. In this regard, if the packet 110 originally received by the switching element 33 is Ethernet compliant and, hence, satisfies byte length requirements of applicable Ethernet protocols, then the length of the packet 163, which should be no shorter than the packet 110 from which it is derived, should also satisfy such byte length requirements.

An exemplary operation and use of the switching element 33 in detecting and handling an exception will now be described below with particular reference to FIG. 9.

For illustrative purposes, assume that the switching element 33 is configured to switch Ethernet data packets, as described above. Further, assume that the switching element 33 is configured to detect an exception for data packets that have a particular destination address, referred to hereafter as the "Exception Address." Also assume that, for such exception, a protocol stack 89 is to be selected that changes the destination address of the IP packet encapsulated within such packet to a particular address, referred to hereafter as the "Modified Address."

Now assume that an ingress port 41 of the switching element 33 receives an Ethernet packet 110 having a header 112 (FIG. 6) that includes the Exception Address as the packet's destination address. Such packet 110 is parsed and classified by the parser 71 and the classifier 72, respectively, as shown by block 212 of FIG. 9. In classifying the packet 110, the classifier 72 assigns a flow identifier to the packet 110, as is known in the art. Further, the classifier 72 determines whether the packet 110 has an exception, as shown by block 215 of FIG. 9. If no exception is detected, then the classifier 72 determines whether the packet 110 was received from the processing element 63, as shown by block 218. In the instant example, the packet 110 is received from an ingress port 41, and the classifier 72, therefore, makes a "no" determination in block 218. As shown by block 221, the classifier 72 uses the flow identifier as a key to look up, in the forwarding table 52, the queue identifier of the egress queue 76 that is to receive the packet 110. The packet 110 is then forwarded to such egress queue 76 by the forwarding logic 75, as shown by block 222 of FIG. 9, such that the packet 110 eventually egresses from the switching element 33 via the egress port 49 that is coupled to the foregoing egress queue 76.

However, in the instant example, the received data packet 110 has an exception since its destination address in the header 112 matches the Exception Address. Thus, the classifier 72 appends, to the pad field 118, metadata 131 indicative of at least one packet attribute thereby providing a modified packet 133, as shown by block 225 of FIG. 9. In addition, the classifier 72 calculates a new FCS 136 that accounts for the embedded metadata 131 and replaces the FCS 122 with the newly calculated FCS 136, as shown by block 228 of FIG. 9. Further, the classifier 72 associates the modified packet 133 with a queue identifier that identifies the exception queue 79 such that the modified packet 133 is forwarded to this queue 79 by the forwarding logic 75, as shown by block 232 of FIG. 9.

Eventually, the modified packet 133 passes through the exception queue 79 and is transmitted via the protocol-specific bus 66 to the processing element 63. The exception logic 88 of the processing element 63 finds the metadata 131 within the packet 133 and selects one of the protocol stacks 89 to process the packet 133 based on the metadata 131, as shown by block 235 of FIG. 9. The selected protocol stack 89 then processes the packet 133 thereby handling the packet's exception, as shown by block 241 of FIG. 9.

In the instant example, the selected protocol stack 89 finds the IP packet carried within the payload field 115 and replaces the IP destination address within the overhead of this packet with the Modified Address. The modified packet 133 is then transmitted to the parser 71 via the protocol-specific bus 69, and the process shown by FIG. 9 returns to block 212. Thus, the parser 71 and classifier 72 respectively parse and classify the packet 133. In classifying the packet 133, the classifier 72 assigns a flow identifier to the packet 110, as is known in the art.

Since the modified packet 133 is received from the processing element 63, the classifier 72 determines that the packet 133 does not have an exception. In addition, since the modified packet 133 is received from the processing element 63, the classifier 72 is aware that the packet 133 has metadata 131 embedded within it. Thus, the classifier 72 strips the metadata 131 from the packet 113, as shown by block 252 of FIG. 9, and calculates a new FCS 167 (FIG. 8) that accounts for the stripping of the metadata 131. The classifier 72 replaces the FCS 136 with the newly calculated FCS 167, as shown by block 255 of FIG. 9, thereby providing a modified packet 163 that is devoid of the metadata 131.

Figure 9:
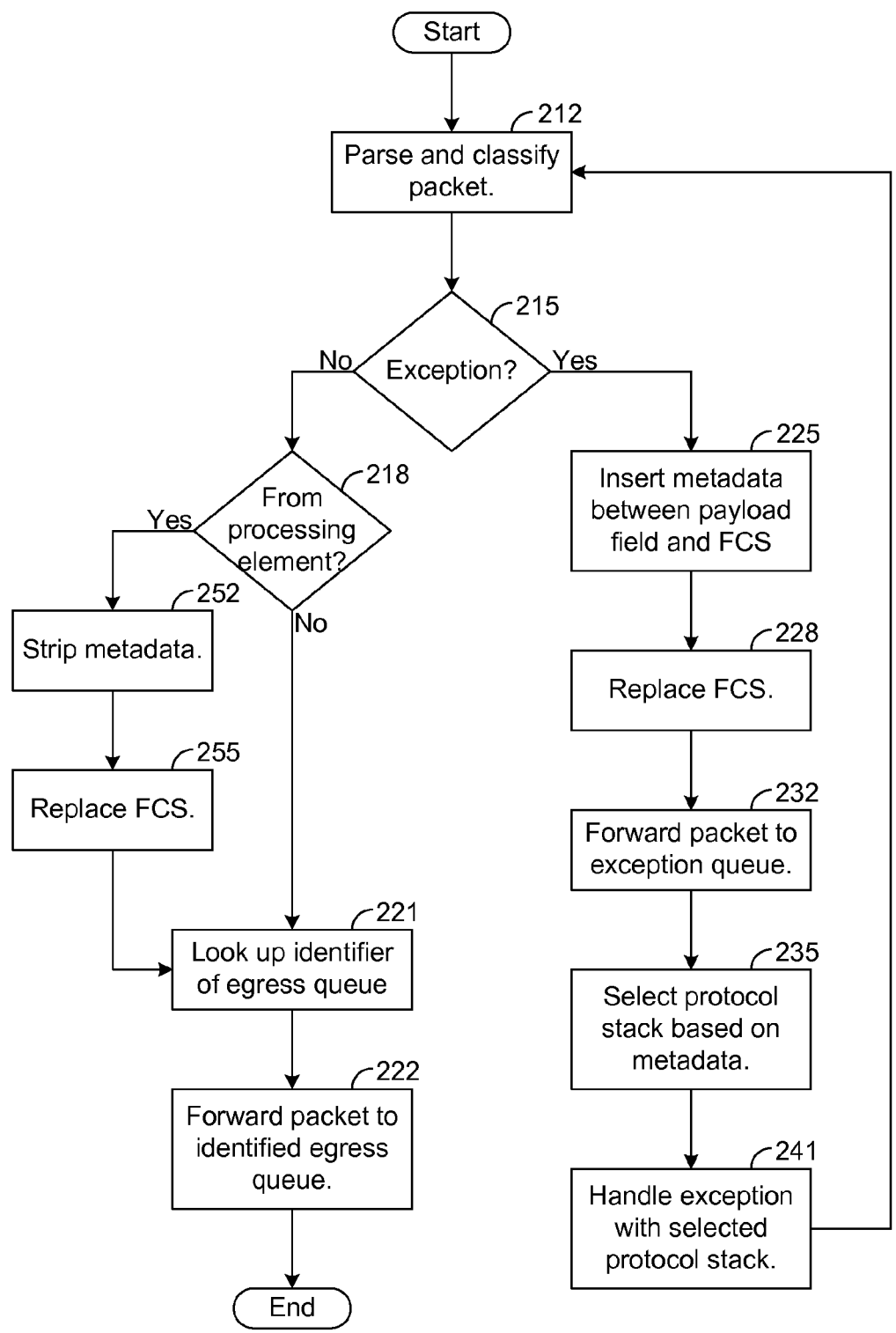
FIG. 9 is flow chart illustrating an exemplary method for processing a data packet.

As shown by block 221 of FIG. 9, the classifier 72 uses the flow identifier assigned to the packet 163 as a key to look up, in the forwarding table 52, the queue identifier of the egress queue 76 that is to receive the packet 163. The packet 163 is then forwarded to such egress queue 76 by the forwarding logic 75, as shown by block 222 of FIG. 9, such that the packet 163 eventually egresses from the switching element 33 via the egress port 49 that is coupled to the foregoing egress queue 76.

Accordingly, the switching element 33 is configured to embed metadata 131 in packets for which exceptions are detected. The metadata 131 is embedded in such a way that the packets remain compliant with applicable protocol requirements and the packets are not rendered invalid by the protocol stacks 89 that are selected to handle the packets. Further, after the packets are handled by the processing element 63, the metadata 131 is stripped from the packets in an effort to reduce the packet length and, hence, transmission burdens. In one exemplary embodiment, the packets are encapsulated in accordance with Ethernet protocols and remain compliant with such protocols. However, it should be emphasized that Ethernet protocols are described herein for illustrative purposes, and other types of protocols may be employed in other embodiments, if data inserted after the payload field does not cause a violation in the protocol integrity.

Now, therfore, the following is claimed:

1. A network switch, comprising:
   at least one ingress port;
   a plurality of egress ports;
   switching logic configured to receive at least a first data packet and a second data packet from the ingress port and to forward the second data packet to one of the egress ports, the switching logic configured to detect an exception for the first data packet and to direct the first data packet to an exception queue in response to the detected exception, the switching logic further configured to determine metadata indicative of at least one attribute of the first data packet, wherein the first data packet has a header, a payload field, a pad field, and a first frame check sequence, wherein the header precedes the payload field, wherein the payload field precedes the pad field, and wherein the pad field precedes the frame check sequence, wherein the pad field is between the payload field and the first frame check sequence, and wherein the switching logic is configured to insert the metadata into the first data packet such that the payload field precedes the metadata in the first data packet; and
   a microprocessor configured to receive the first data packet from the exception queue and to read the metadata, the microprocessor further configured to identify the at least one attribute based on the metadata and to handle the exception based on the identified attribute.

2. The network switch of claim 1, wherein the switching logic is configured to calculate a second frame check sequence for the first data packet based on the metadata and to append the second frame check sequence to the metadata.

3. The network switch of claim 1, wherein the first data packet is compliant with Ethernet protocol.

4. The network switch of claim 1, wherein the microprocessor is configured to transmit the first data packet to the switching logic after handling the exception, and wherein the switching logic is configured to forward the first data packet to an egress queue coupled to one of the egress ports based on a forwarding table.

5. The network switch of claim 4, wherein the switching logic is configured to strip the metadata from the first data packet.

6. The network switch of claim 1, wherein the microprocessor comprises a plurality of protocol stacks and exception logic, wherein the exception logic is configured to select one of the protocol stacks for handling the exception based on the metadata.

7. A network switch, comprising:
   at least one ingress port;
   a plurality of egress ports;
   switching logic configured to receive at least a first data packet and a second data packet from the ingress port and to forward the second data packet to one of the egress ports, the switching logic configured to detect an exception for the first data packet and to direct the first data packet to an exception queue in response to the detected exception, the switching logic further configured to determine metadata indicative of at least one attribute of the first data packet, wherein the first data packet has a header, a payload field, and a first frame check sequence, wherein the header precedes the payload field, wherein the payload field precedes the first frame check sequence, and wherein the switching logic is configured to modify the first data packet such that the first frame check sequence is changed based on the metadata to a second frame check sequence and such that the metadata is inserted into the first data packet between the payload field and the second frame check sequence; and
   a microprocessor configured to receive the first data packet from the exception queue and to read the metadata, the microprocessor further configured to identify the at least one attribute based on the metadata and to handle the exception based on the identified attribute.

8. The network switch of claim 7, wherein the first data packet has a pad field between the payload field and the first frame check sequence, and wherein the metadata is inserted into the first data packet between the pad field and the second frame check sequence.

9. The network switch of claim 7, wherein the first data packet is compliant with Ethernet protocol.

10. The network switch of claim 7, wherein the microprocessor is configured to transmit the first data packet to the switching logic after handling the exception, and wherein the switching logic is configured to forward the first data packet to an egress queue coupled to one of the egress ports based on a forwarding table.

11. The network switch of claim 10, wherein the switching logic is configured to strip the metadata from the first data packet.

12. The network switch of claim 7, wherein the microprocessor comprises a plurality of protocol stacks and exception logic, wherein the exception logic is configured to select one of the protocol stacks for handling the exception based on the metadata.

13. A method for use in a network switch, comprising the steps of:
   receiving a first data packet and a second data packet via at least one ingress port of the network switch;
   forwarding the second data packet to one of a plurality of egress ports of the network switch;
   trapping the first data packet thereby transmitting the first data packet to a microprocessor of the network switch, wherein the first data packet has a header, a payload field, and a frame check sequence at an end of the first data packet, wherein the header precedes the payload field, and wherein the payload field precedes the frame check sequence;
   determining metadata indicative of at least one attribute of the first data packet; changing the frame check sequence based on the metadata;
   inserting the metadata into the first data packet such that the payload field precedes the metadata in the first data packet;
   reading the metadata via the microprocessor;
   identifying the at least one attribute based on the reading step;
   handling an exception for the first data packet via the microprocessor based on the identified attribute; and
   transmitting the first data packet from the microprocessor to one of the egress ports.

14. The method of claim 13, further comprising the step of stripping the metadata from the first data packet before the transmitting step.

15. The method of claim 13, wherein the first data packet has a pad field between the payload field and the frame check sequence, and wherein the inserting step comprises the step of appending the metadata to the pad field.

16. The method of claim 13, wherein the first data packet is compliant with Ethernet protocol.

17. The method of claim 13, wherein the microprocessor comprises a plurality of protocol stacks, and wherein the method further comprises the step of selecting one of the protocol stacks for handling the exception based on the metadata.

18. The network switch of claim 1, wherein the at least one attribute is a port identifier identifying the ingress port that received the first data packet.

19. The network switch of claim 1, wherein the network switch is configured to strip the metadata from the first data packet before transmitting the first data packet from the network switch.

20. The network switch of claim 1, wherein the switching logic is configured to append the metadata to the pad field.

21. The network switch of claim 1, wherein the switching logic is configured to calculate a second frame check sequence for the first data packet based on the metadata and to replace the first frame check sequence in the first data packet with the second frame check sequence.

22. The network switch of claim 21, wherein the switching logic is configured to append the metadata to the pad field such that the metadata is between the pad field and the second frame check sequence.

23. The network switch of claim 1, wherein the at least one attribute is an exception identifier indicative of an exception type of the detected exception.

24. The network switch of claim 23, wherein the microprocessor has a plurality of protocol stacks and is configured to select one of the protocol stacks for handling the exception based on the exception identifier.

25. The network switch of claim 7, wherein the at least one attribute is a port identifier identifying the ingress port that received the first data packet.

26. The network switch of claim 7, wherein the at least one attribute is an exception identifier indicative of an exception type of the detected exception.

27. The network switch of claim 26, wherein the microprocessor has a plurality of protocol stacks and is configured to select one of the protocol stacks for handling the exception based on the exception identifier.

28. The method of claim 13, wherein the at least one attribute is a port identifier identifying the ingress port that received the first data packet.

29. The method of claim 13, further comprising the steps of:
   transmitting the first data packet from the one egress port; and
   stripping the metadata from the first data packet before the transmitting the first data packet from the one egress port.

30. The method of claim 15, wherein the appending step comprises the step of appending the metadata to the pad field between the pad field and the frame check sequence.

31. The method of claim 13, wherein the method further comprises the steps of:
   detecting an exception for the first data packet, wherein the trapping step is performed in response to the detecting step; and
   identifying an exception type of the detected exception based on the at least one attribute.

32. The method of claim 31, wherein the microprocessor has a plurality of protocol stacks, and wherein the method further comprises the step of selecting one of the protocol stacks for handling the exception based on the identifying the exception type step.

* * * * *